US012613976B1

(12) United States Patent
 Blanc Dit Grenadier et al.

(10) Patent No.: US 12,613,976 B1
(45) Date of Patent: Apr. 28, 2026

(54) DETECTION OF SHADOW APPLICATION PROGRAMMING INTERFACES WITHIN A SOFTWARE APPLICATION

(71) Applicant: BLACK DUCK SOFTWARE, INC., Sunnyvale, MA (US)

(72) Inventors: Nicolas Blanc Dit Grenadier, Lyons (FR); Niv Mamam, Ramat Gan (IL)

(73) Assignee: Black Duck Software, Inc., Sunnyvale, MA (US)

( * ) Notice: Subject to any disclaimer, the term of this patent is extended or adjusted under 35 U.S.C. 154(b) by 120 days.

(21) Appl. No.: 18/644,969

(22) Filed: Apr. 24, 2024

(51) Int. Cl.
 *G06F 21/57* (2013.01)
 *G06F 9/54* (2006.01)
(52) U.S. Cl.
 CPC .............. *G06F 21/577* (2013.01); *G06F 9/54* (2013.01); *G06F 2221/033* (2013.01)

(58) Field of Classification Search
 CPC ..... G06F 21/577; G06F 9/54; G06F 2221/033
 See application file for complete search history.

(56) References Cited

U.S. PATENT DOCUMENTS

| | | | | |
|---|---|---|---|---|
| 2022/0300279 A1* | 9/2022 | Baker | ...................... | G06F 8/71 |
| 2024/0320425 A1* | 9/2024 | Shek | .................. | G06F 11/3698 |

* cited by examiner

*Primary Examiner* — Shirley X Zhang
(74) *Attorney, Agent, or Firm* — Patterson + Sheridan, LLP

(57) ABSTRACT

Shadow application programming interface (API) endpoints are detected within a software application by obtaining API documentation and an implemented API endpoint for the software application. The implemented API endpoint is obtained during an implementation of the software application. API endpoint is generated comparison data from the API documentation. Further, an indication of whether the implemented API endpoint is a shadow API endpoint is determined based on a comparison of the API endpoint comparison data with the implemented API endpoint. The indication is output.

17 Claims, 6 Drawing Sheets

100

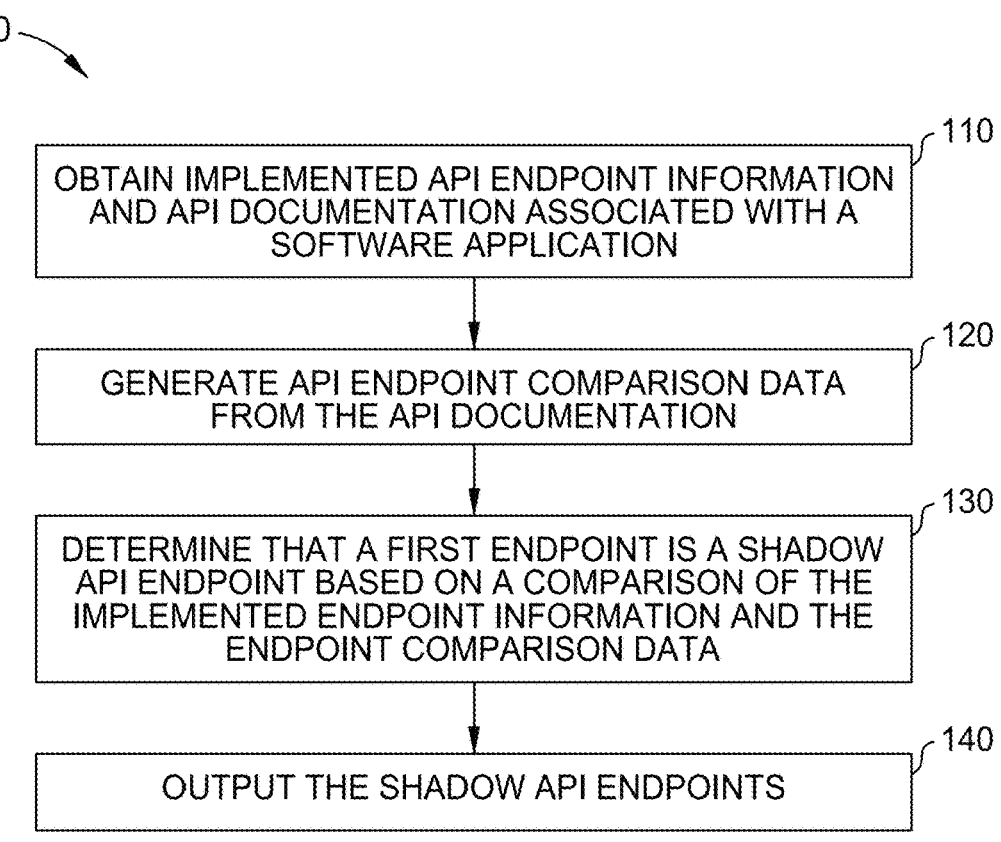

110

OBTAIN IMPLEMENTED API ENDPOINT INFORMATION AND API DOCUMENTATION ASSOCIATED WITH A SOFTWARE APPLICATION

120

GENERATE API ENDPOINT COMPARISON DATA FROM THE API DOCUMENTATION

130

DETERMINE THAT A FIRST ENDPOINT IS A SHADOW API ENDPOINT BASED ON A COMPARISON OF THE IMPLEMENTED ENDPOINT INFORMATION AND THE ENDPOINT COMPARISON DATA

140

OUTPUT THE SHADOW API ENDPOINTS

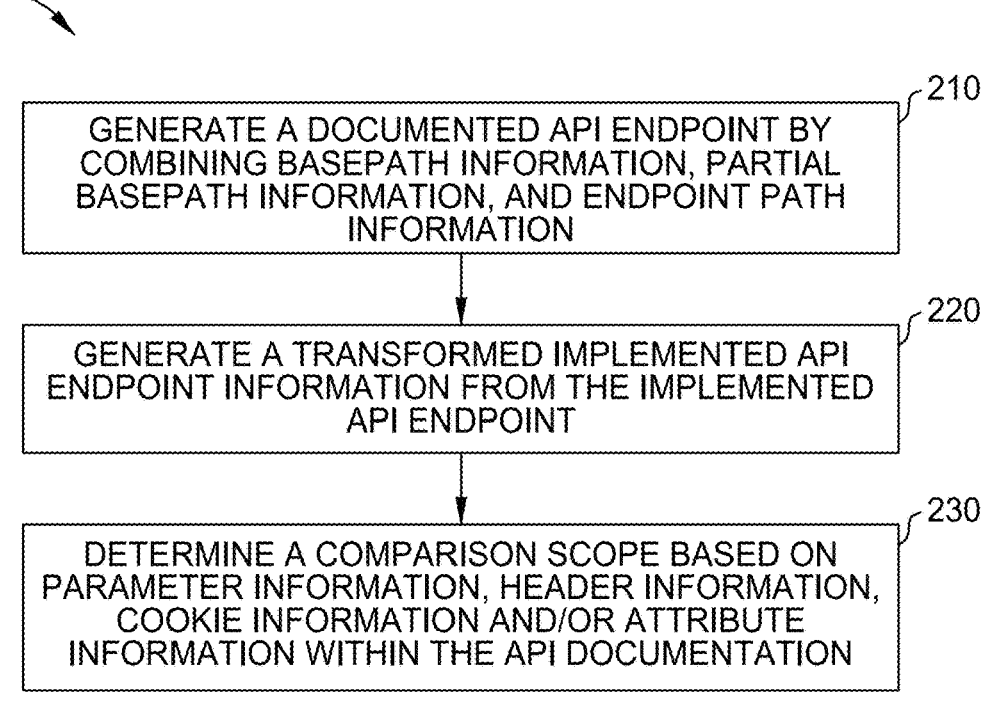

210

GENERATE A DOCUMENTED API ENDPOINT BY COMBINING BASEPATH INFORMATION, PARTIAL BASEPATH INFORMATION, AND ENDPOINT PATH INFORMATION

220

GENERATE A TRANSFORMED IMPLEMENTED API ENDPOINT INFORMATION FROM THE IMPLEMENTED API ENDPOINT

230

DETERMINE A COMPARISON SCOPE BASED ON PARAMETER INFORMATION, HEADER INFORMATION, COOKIE INFORMATION AND/OR ATTRIBUTE INFORMATION WITHIN THE API DOCUMENTATION

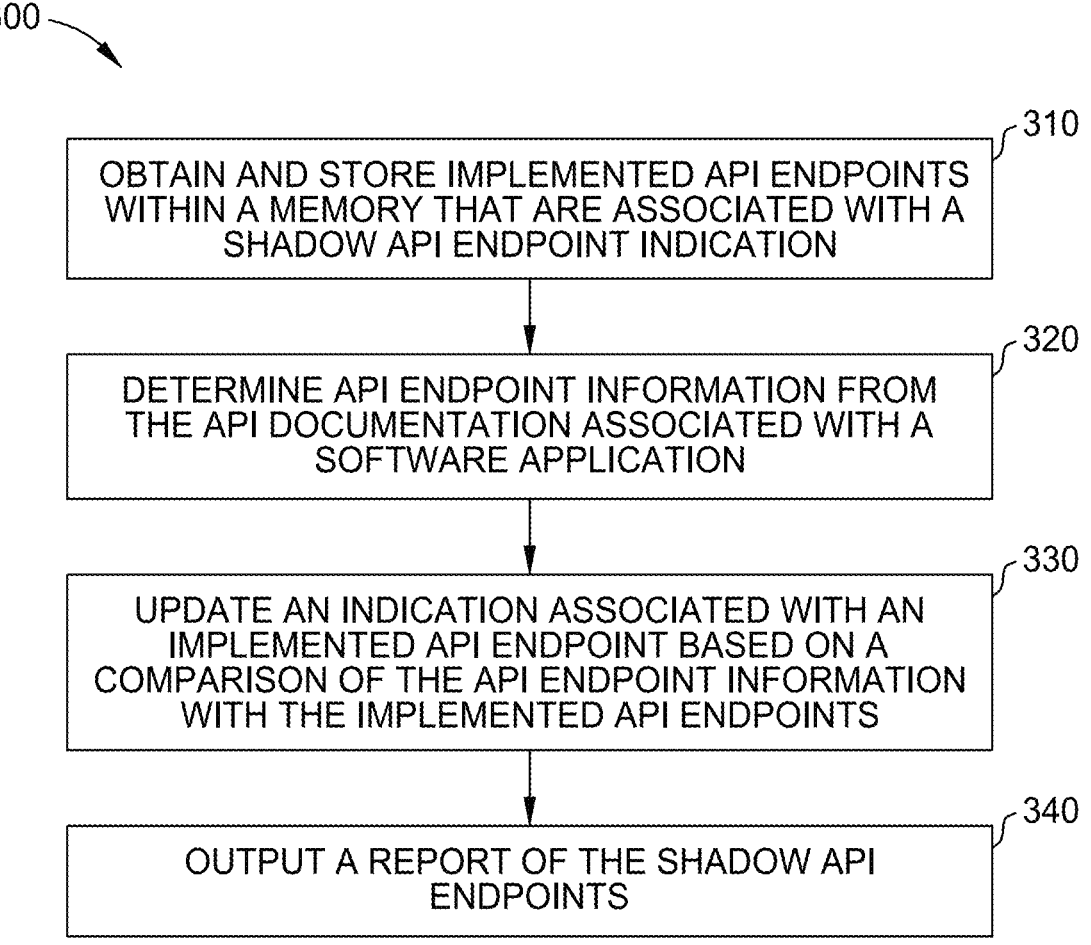

310
OBTAIN AND STORE IMPLEMENTED API ENDPOINTS WITHIN A MEMORY THAT ARE ASSOCIATED WITH A SHADOW API ENDPOINT INDICATION

320
DETERMINE API ENDPOINT INFORMATION FROM THE API DOCUMENTATION ASSOCIATED WITH A SOFTWARE APPLICATION

330
UPDATE AN INDICATION ASSOCIATED WITH AN IMPLEMENTED API ENDPOINT BASED ON A COMPARISON OF THE API ENDPOINT INFORMATION WITH THE IMPLEMENTED API ENDPOINTS

340
OUTPUT A REPORT OF THE SHADOW API ENDPOINTS

FIG. 3

```
"/store/order/{orderId}":
{
    "get":
    {
        "tags":
        {
                "store"
        },
        "summary":   "Find purchase order by ID",
        "description":   "For valid response try integer IDs with value <= 5 or > 10.  Other values will generate exceptions.",
        "operationId":  "getOrderByID",
        "parameters":
        [
            {
                "name":  "orderID",
                "in":    "path",
                "description":   "ID of order that needs to be fetched",
                "required":   true,
                "schema":
                {
                    "type": "integer",
                    "format":  "int64"
                }
            }
        ],
        "responses":
        {
            "200":
            {
                "description":   "successful Operation",
                "content":
                {
                    "application/xml":
                    {
                        "schema":
                        {
                            "$ref":  "#/components/schemas/Order"
                        }
                    },
                    "application/json":
                    {
                        "schema":
                        {
                            "$ref":  "#/components/schemas/Order"
                        }
                    }
                }
            },
            "400":
            {
                "description":   "Invalid ID supplied"
            },
            "404":
                "description":   "Order not found"
            }
        }
    },
```

FIG. 6

DETECTION OF SHADOW APPLICATION PROGRAMMING INTERFACES WITHIN A SOFTWARE APPLICATION

TECHNICAL FIELD

The present disclosure relates to detecting security vulnerabilities associated with shadow application programming interface endpoints within a software application.

BACKGROUND

Software applications include application programming interfaces (APIs). An API is a set of rules or protocols that provide a way for two or more applications to interact (communicate) with each other to exchange data, features, and functionality. Software applications include web applications. A web application is an application that is stored on a remote server and accessible via the internet through a browser interface. A web application exposes API endpoints that allow for communication with other clients (e.g., a browser or other application, among others). An API endpoint is a location within an API that accepts requests and sends back responses. An API endpoint is a digital location where an API receives a requests about a specific resource. An API endpoint may be a uniform resource locator (URL) that provides the location of a resource.

API endpoints are publically available, and can be used by others to maliciously access, or attack, the software application. A software application undergoes testing and validation to secure the corresponding API endpoints.

Software security processes are used to secure the API endpoints of a software applications by mitigating unauthorized access and/or other malicious access to the software applications. As the API endpoints of a software application are documented, the documented API endpoints are used to define possible attacks of a software application. The software security protects the software applications by identifying weaknesses within the software applications.

A shadow API endpoint is a weakness within a software application. A shadow API endpoint is an API endpoint that is not documented, partially documented, or incorrectly documented within the documentation of the corresponding software application. A shadow API endpoint may allow unauthorized access to the corresponding software application. Due to the lack of documentation, shadow API endpoints may be present within the final production version of the software application.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 illustrates a flowchart of a method for determining security vulnerabilities within a software application.

FIG. 2 illustrates a flowchart of a method for generating application programming interface comparison information for a software application.

FIG. 3 illustrates a flowchart of a method for mitigating security vulnerabilities within a software application.

FIG. 6 illustrates an example of a portion of an Application Programming Interface documentation.

DETAILED DESCRIPTION

Figure 4:
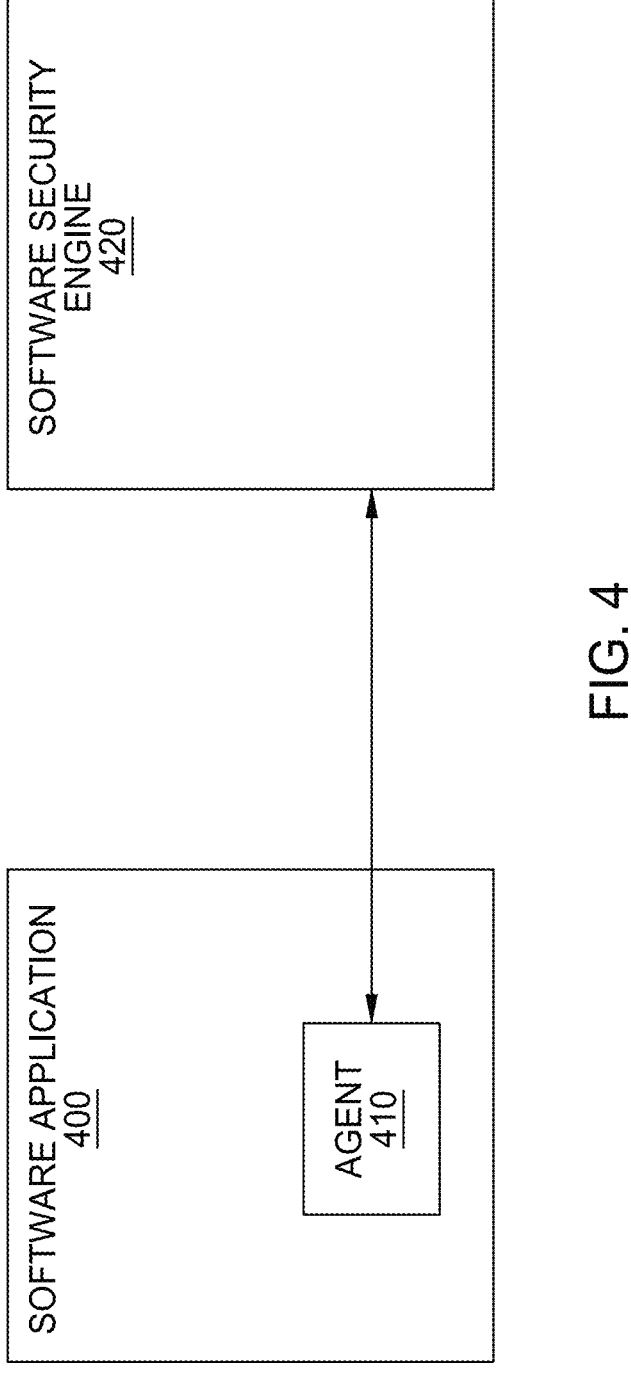
FIG. 4 illustrates a block diagram of a software application, an agent implemented within the software application, and a software security engine for detecting security vulnerabilities within the software application.

Aspects of the present disclosure relate to detection of shadow application programming interfaces (APIs) within a software application.

A security software engine that may be performed by a processing device is used to detect and, in some examples, mitigate security vulnerabilities within software applications. The security vulnerabilities may allow unauthorized and/or malicious access to a software application. Accordingly, by detecting the security vulnerabilities within a software application, the software vulnerabilities may be mitigated, limiting unauthorized and/or malicious access to the software application.

A software application may include an API. An API is a set of rules or protocols used by software applications to interact (communicate) with each other. The interactions include the exchange of data, features, and/or the support operations of functions within the software application. An example of a software application is an internet based application or a web application. A web application is software application that is stored on a remote server and accessible via the internet through a browser interface.

In a web application, API endpoints (or endpoints) are used to communicate with other clients e.g., a browser or other application, among others). In a web application, an API endpoint is exposed to allow for the web application communication with clients (e.g., a browser or other software application, among others). An API endpoint is a location within an API that accepts requests and sends back responses. An API endpoint may be a digital location, and corresponds with where a corresponding API receives a requests about a specific resource. In one example, an API endpoint may be a uniform resource locator (URL) that provides the location of a resource. In other examples, an API endpoint may be other types of address format.

To aid in facilitating communication to and from a software application, the associated API endpoints are publicly available. As the API endpoints are publicly available, the API endpoints may be used by an unauthorized user to maliciously access, or attack, the software application.

The software application design process includes a testing process and a validation process that may be performed by a processing device to secure the API endpoints of the software application. During testing and validation, the documented API endpoints of a software application are secured to prevent unauthorized and/or malicious access to the software application. The software security protects the software applications by identifying weaknesses within the software applications. Securing an API endpoint includes mitigating unauthorized access and/or other malicious access to the software applications. However, not all of the API endpoints of a software application may be fully documented within a corresponding API documentation. FIG. 6 illustrates a portion of example API documentation 600. The portion of the example API documentation 600 illustrates an example documented API endpoint. In one or more examples, the API endpoints may be generated by a designer or another computer system. In one example, an API endpoint may be not documented, partially documents, or incorrectly documented. During testing and validation, the documented API endpoints are used to define possible attacks of a software application. However, undocumented, partially documented, or incorrectly documented API endpoints are not tested and validated, as the API endpoints are unknown (e.g., not documented). Accordingly, such API endpoints may be security weaknesses.

Undocumented, partially documented, and incorrectly documented API endpoints may be referred to as shadow API endpoints. Due to the insufficient documentation, a shadow API endpoint is a security weakness within a software application, as a shadow API endpoint may allow for authorized and/or malicious access to the application. However, due to the lack of documentation, shadow API endpoints may be untested by the testing and validation processes, and present within the final production software application.

Shadow API endpoints may be due to the API documentation not being correctly updated, deprecated API endpoints being removed from the documentation but not the code of the software application, and/or temporary API endpoints introduced during software development for debugging and/ or testing purposes.

As software applications become more complex, more API endpoints within the software application are exposed. Accordingly, it is exceedingly difficult to compare the code of the software application with the documented API endpoints. Due to the difficulty in detecting all of the API endpoints within a software application, the processing resources and processing time used to mitigate the security vulnerabilities are increased. In one or more examples, due to the difficulty in detecting all of the API endpoints within a software application, one or more security vulnerabilities may not be mitigated and present within the final software application, decreasing the security of the software application. Accordingly, there is a need for a software application security process that is able to detect and/or mitigate shadow API endpoints without increasing the processing resources and/or processing time used to mitigate the security vulnerabilities, while increasing the number of security vulnerabilities that are mitigated within a software application.

The software security process described in the following compares the API endpoints of a software application implementation with the corresponding API documentation to determine (e.g., detect) API endpoints that are within the software application implementation and not documented, or partially documented, within the API documentation (e.g., shadow API endpoints). An implemented software application is a running or executed software application. For example, a software application is implemented by a computer system (e.g., the computer system 700 of FIG. 7), such that the software application is running, and executed by the computer system. The detected shadow APIs may be mitigated or reported to another system for mitigation. In one example, an agent is embedded within a software application implementation. The agent detects the API endpoints within the software application implementation (e.g., implemented API endpoints). Further, the agent determines the API endpoints included within the corresponding API documentation. The format of the API endpoint within the API documentation is transformed, so that the API endpoints of the software application implementation and the corresponding API documentation can be compared. API endpoints that are within the implemented software application and are not included within the corresponding API documentation are determined to be shadow API endpoints. The shadow API endpoints are mitigated and/or are saved and output for mitigation by another system.

Technical advantages of the present disclosure include, but are not limited to, detecting shadow API endpoints within a software application implementation (e.g., a software application implemented (executed) within a computer system). Accordingly, undocumented, partially documented, or incorrectly documented API endpoints are determined (e.g., detected), and the corresponding security vulnerabilities can be mitigated. Detecting the security vulnerabilities associated within the undocumented, partially documented, or incorrectly documented API documents, allows for the mitigation undocumented, partially documented, or incorrectly documented API documents, increasing the security of corresponding software application by reducing unauthorized access to the software application. In one or more examples, the detection of shadow API endpoints as described in the following improves the functional operation of the corresponding computer system as less processing resources and/or time are used to detect the shadow API endpoints as compared to other detection methods.

FIG. 1 illustrates a flowchart of a method 100 for determining shadow API endpoints, according to one or more examples. In one example, the method 100 is performed by a computer system (e.g., the computer system 700 of FIG. 7). For example, one or more processing devices (e.g., the processing device 702 of FIG. 5) executes instructions (e.g., the instructions 726 of FIG. 7) stored in a memory (e.g., the main memory 704 and/or the machine-readable medium 724 of FIG. 7) to perform the method 100. In one example, the method 100 is performed part of a software application security testing process. A software security testing process may be used to determine (e.g., detect or identify) vulnerabilities within a software application. In one or more examples, the software security testing process determines whether a security vulnerability can be exploited. The software security testing process may output a list of detected security vulnerabilities for mitigation by a user or another system, or mitigate the detected security vulnerabilities.

At 110, implemented API endpoint information and API documentation associated with a software application are obtained. In one example, one or more processing devices execute instructions stored in a memory to obtain implemented API endpoint information and API documentation from a software application. The implemented API endpoint information is obtained from an implemented (or running) software application.

In one example, an agent is embedded within a software application. The agent obtains the API endpoint information and API documentation from the software application. An agent is a code based instrumentation element embedded within a software application. In one example, the code associated with the agent is inserted within a software application to implement the agent. For example, an agent is embedded in a Java web application by using the "java agent" option in the Java web application startup command line. A processing device implements the code to perform the functions (e.g., operations) of an agent.

Figure 5:
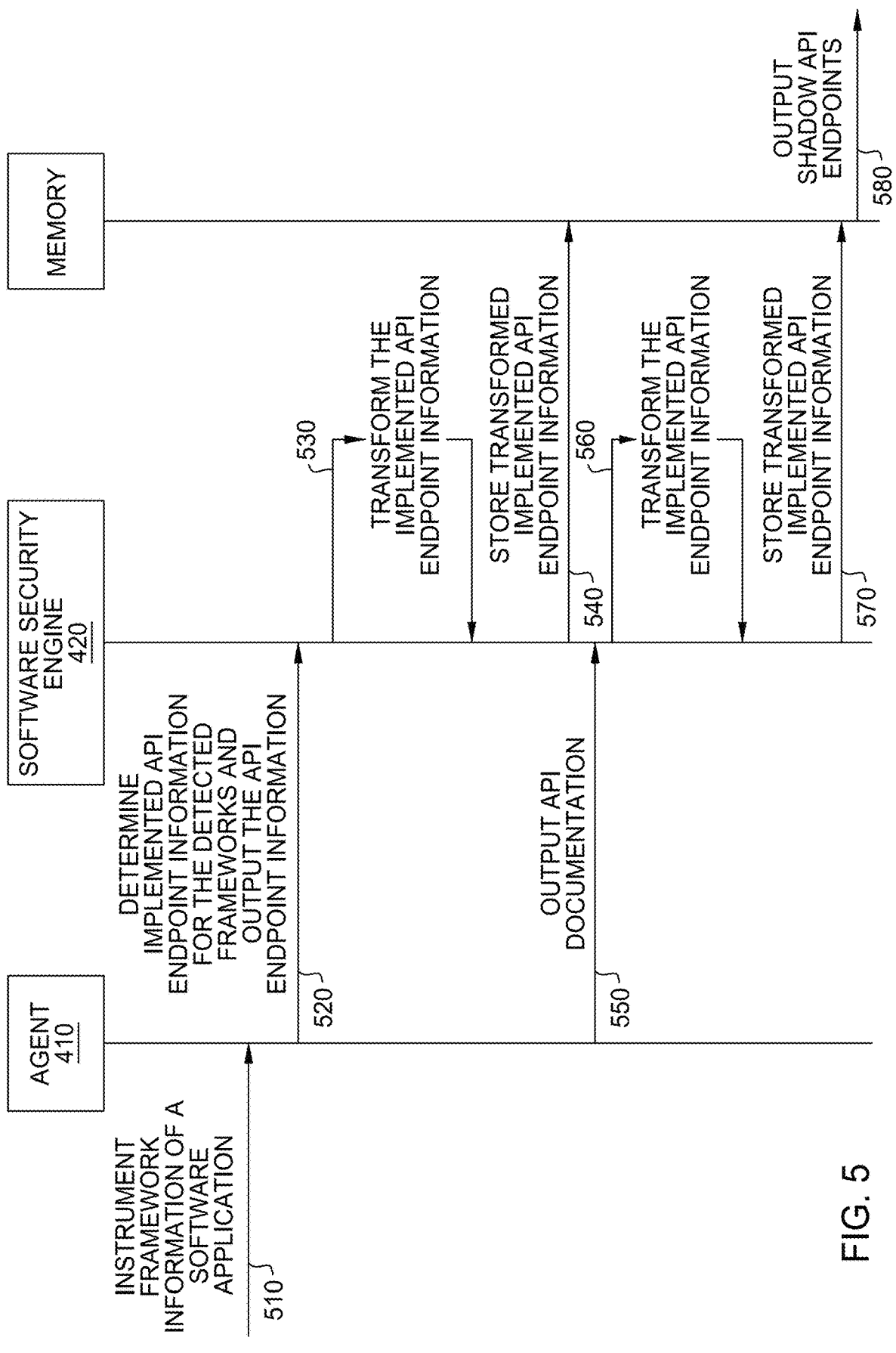
FIG. 5 depicts a diagram of a method for detecting security vulnerabilities within a software application.

FIG. 4 illustrates the software application 400 and the agent 410. The code of the agent 410 is executed (e.g., implemented) as part of the software application 400 (e.g., within the code of the software application 400). In one example, the software application 400 is a web application. The software application 400 is implemented by the computer system 700 of FIG. 7, such that the software application 400 is running within the computer system 700. The agent 410 is an instrumentation element applied to the software application 400. For example, the agent 410 is embedded within the code of the software application 400. The agent 410 instruments the frameworks used by the software application 400. In one example, the agent 410 analyzes the flow of data to and from the software application 400 while the software application 400 is running (e.g., executed or implemented), to detect the corresponding implemented API endpoints. Data is communicated to and from the software application 400 via an API endpoint or API endpoints. By analyzing the flow of data to and from the software application 400, the agent 410 is able to detect the API endpoints within the software application 400 that are being used. As is illustrated in FIG. 5, the agent 410 is executed at 510 to detect frameworks within a running software application.

In one example, the address information for a software application includes a format as "http(s)://<APPLICA-TION_URL>/basepath/<API endpoint path>". An implemented API endpoint corresponds to "<APPLICATION_URL>/basepath/<API endpoint path>".

The agent 410 obtains the framework information and determines the implemented API endpoints from the framework information. In one example, the agent will use reflection on the framework code to obtain the API endpoints. A reflection API may inspect classes, methods, properties, and types from within the system by exposing an internal behavior, for example by overriding a visibility constraint during testing. Further, for each different framework, one or more implemented API endpoints are determined.

Figure 7:
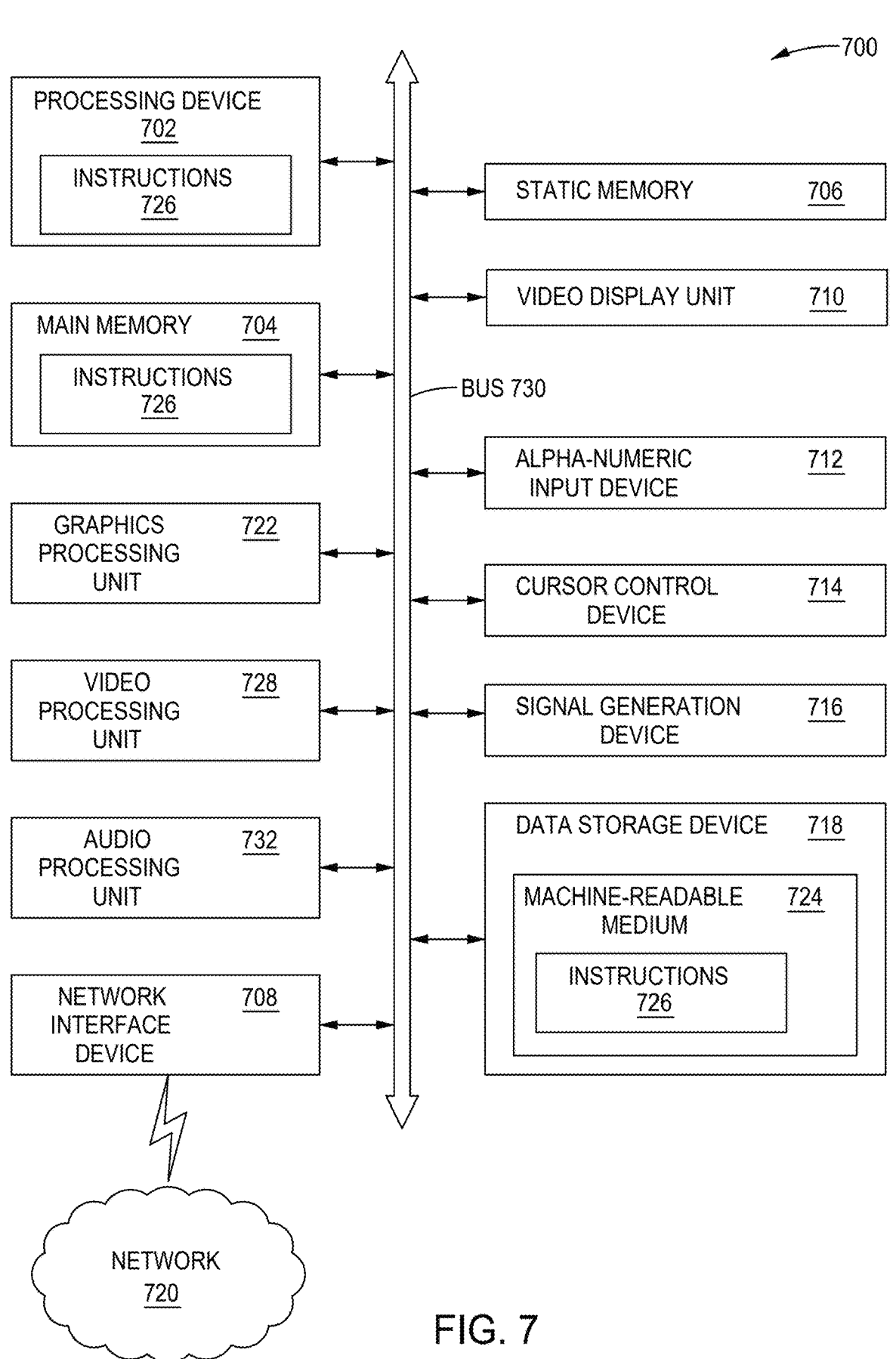
FIG. 7 depicts a diagram of an example computer system in which embodiments of the present disclosure may operate.

The detected implemented API endpoints are stored within a memory (e.g., the main memory 704 and/or the machine-readable medium 724 of FIG. 7) as implemented API endpoint information. In one example, the agent 410 is communicatively coupled with a software security engine 420. In one example, the software security engine 420 is executed by one or more processing devices executing instructions stored in a memory. The software security engine 420 detects security vulnerabilities within the software application 400 based on data provided by the agent 410. For example, the software security engine 420 detects security vulnerabilities (e.g., shadow API endpoints) based on the implemented API endpoint information determined by the agent 410. In one example, the software security engine 420 obtains the implemented API endpoint documentation from a memory or receives the implemented API endpoint documentation from the agent 410.

The software application 400, the agent 410, and the software security engine 420 are executed by a computer system (e.g., the computer system 700 of FIG. 7), on different computer systems, or across multiple computers systems as part of distributed computer system having two or more interconnected computer systems.

Further, the agent 410 obtains API documentation from the software application 400. In one example, the agent 410 obtains the API documentation for the software application from a memory (e.g., the main memory 704 and/or the machine-readable medium 724 of FIG. 7). For example, the agent 410 uses reflection on a specific library in charge of generating API documentation within the software application. In one example, the agent 410 outputs the API documentation to the software security engine 420 and/or to a memory. In one example, the agent 410 determines API endpoint information from the API documentation. For example, the agent 410 examines (e.g., evaluates or analyzes) the API documentation to detect API endpoints from the API documentation. In one example, the API documentation is examined to detect text that is associated the API endpoints.

At 120, endpoint comparison data is generated from the API documentation and implemented APIs. In one example, one or more processing devices execute instructions stored in a memory to generate the endpoint comparison data from the API documentation. An API documentation includes a list of API endpoints within the API. Generating the endpoint comparison data from the API documentation includes transforming (e.g., reformatting) the API endpoint information within the API documentation.

FIG. 2 illustrates a flowchart of an example method for generating the endpoint comparison data from the API documentation and implemented API endpoints. At 210, a documented API endpoint is generated by combining basepath information, partial path information (partial basepath information), and endpoint path information (end point basebath information). The basepath information is an address segment (e.g., an URL segment or URL prefix) of an API endpoint path, relative to a host root. The partial path information corresponds to API paths or resources that are exposed by the API for communication purposes. The endpoint path information corresponds to operations associated with the API endpoints. In one example, the software security engine 420 generates the documented API endpoint by combining the basepath information, the partial path information, and the endpoint path information.

With reference to FIG. 5, at 550, the API documentation is output from the agent 410 to the software security engine 420, e.g., via a memory and/or directly. Further, at 560 of FIG. 5, the software security engine 420 determines (e.g., generates) the documented API endpoints, including transforming the document API endpoint information to generate the document API endpoints.

An API endpoint is defined by a path (e.g., /rest/api/operation) and a type (e.g., GET, POST, HEAD, PUT, DELETE, CONNECT, OPTIONS, TRACE, and PATCH, among others). The path of an API endpoint indicates a resource (e.g., resource path) or route of the API endpoint. A type corresponds to an operation associated with the API endpoint. The association of the path of the API endpoint and type is used to identify a corresponding API endpoint.

Type GET refers to a method to retrieve a resource. Type POST refers to a method to create a resource. Type HEAD refers to a method to retrieve headers of a response without the response body. Type PUT refers to a method to update a resource by replacing the corresponding content entirely. Type DELETE refers to a method to delete a specific resource. Type CONNECT refers to a method to combine APIs. Type OPTIONS refers to a method to determine what method and headers are supported by a server. Type TRACE contains information about calls made by software applications. Type PATCH is a method to request that a set of changes described to be applied to a resource of the request.

The path of an API endpoint may be altered based on different factors (e.g., a type, a path parameter, a query parameter, a header parameter, and a cookie parameter, among others). Accordingly, the API documentation is processed to transform the API endpoint information within the API documentation into a form that can be compared with the implemented API endpoints.

In one example, an API endpoint is deployed under the base address of <scheme>://<host>/<basepath>/users. In one example, "scheme" represents the transfer protocols used by the corresponding API. A "scheme" may be transfer protocols that include "http", and WebSocket schemes including "ws" and "wss", among others. In one or more examples, "host" is the domain name or IP address of the host that serves the corresponding API. A port number may be included within "host". Example "hosts" include "api.example.com", "example.com:8089", "93,184,216,34", or "93.184.216.34:8089". In one example, if "host" is not specified, the "host" is assumed to the same as where the API documentation is being served. In one or more examples, "basepath" is the address prefix (e.g., URL prefix) for the API paths relative to the host path. An example "basepath" may be "/v2", "/api/v2", or "/", among others. In one example, the base address is "http(s)://<APPLICATION_URL>/basepath/<API endpoint path>.

The API documentation includes the API endpoint path information. In one or more examples, the basepath information for an API endpoint path may be in a format that differs from that of the implemented API endpoint path. As is described above, the implemented API endpoints determined by an agent (e.g., the agent 410) are collected (e.g., determined) from an implemented (e.g., running) software application. Accordingly, for an implemented API endpoint, the absolute (e.g., complete) path is known. However, in the API documentation, a complete path may not be documented, or documented in a format different from that of the implemented API endpoint. In one or more examples, the basepath information for the API endpoints is generated from the API documentation.

In one example, the agent 410 obtains basepath information from a memory, and the basepath is used to determine whether or not an implemented API endpoint is documented within the API documentation. To generate the basepath information, the software security engine 420 concatenates (e.g., combines) the basepath information with partial path information, and endpoint path information to generate the documented API endpoint. The basepath information is an address segment (e.g., an URL segment or URL prefix) of an API endpoint path, relative to a host root. The partial path information corresponds to API paths or resources that are exposed by the API for communication purposes. The endpoint path information corresponds to operations associated with the API endpoints.

A software application may be deployed at one or more addresses. In one example, the software application is a web application. The web application may have multiple addresses, e.g., on different environments during the development lifecycle. The development lifecycle includes a development cycle, a quality assurance testing cycle, and a staging cycle, among others. Each cycle corresponds to a different address (or URL) form. For a web application that has multiple address, an API endpoint exists at different URLs (or addresses). In an example where the API endpoint is "/test" exists at a development cycle URL "<URL_dev>/test", a quality assurance cycle URL "<URL_qa>/test", and a staging cycle URL "<URL_staging>/test".

Each of the addresses that may be assigned to an API endpoint may not be not documented in the API documentation. Accordingly, the endpoint paths for the implemented API endpoints may not be documented within the API documentation, and the implemented API endpoints may not be comparable to the API endpoint data within the API documentation. To allow for the comparison, expected endpoint paths (also referred to as documented endpoint paths herein) are generated based on the API documentation. For example, expected endpoint paths are generated by concatenating (e.g., combining) the basepath information with partial path information, and endpoint path information as is described above.

In one example, the basepath information of "basepath" is an empty set, " " (or not specified), the partial path information of "basepath" is "/"api"", and the endpoint path information of "basepath" is "/"test"". Accordingly, by combining the empty set " " with "api" and "/"test"", the expected endpoint path is "/api/test".

In another example, the basepath information of "basepath" is "api", the partial path information of "basepath" is "/"api"", and the endpoint path information of "basepath" is "/"test"". Accordingly, the expected endpoint path is "/api/test".

In another example, the basepath information of "basepath" is "/", the partial path information of "basepath" is "/"api"", and the endpoint path information of "basepath" is "/"test"". Accordingly, the expected endpoint path is "/api/test".

In another example, the basepath information of "basepath" is "/rest/api", the partial path information of "basepath" is "/"v2"", and the endpoint path information of "basepath" is "/"test"". Accordingly, the expected endpoint path is "/rest/api/v2/test".

In another example, the basepath information of "basepath" is "rest/api", the partial path information of "basepath" is "/"v2"", and the endpoint path information of "basepath" is "/"test"". Accordingly, the expected endpoint path is "/rest/api/v2/test".

In another example, the basepath information of "basepath" is "/rest/api", the partial path information of "basepath" is "/"api"", and the endpoint path information of "basepath" is "/"test"". Accordingly, the expected endpoint path is "/rest/api/test".

In another example, the basepath information of "basepath" is "/rest/api", the partial path information of "basepath" is "/"/rest/api"", and the endpoint path information of "basepath" is "/"test"". Accordingly, the expected endpoint path is "/rest/api/test".

In one example, generating the documented API endpoint includes transforming the format of the documented API endpoint. For example, a format of the documented API endpoint is transformed from a first format to a second format. In one example, transforming the format includes transforming a format of a variable of the documented API endpoint. The variable is a path parameter and is used to point to a specific resource associated with an API.

The software security engine 420 of FIG. 4 converts the format of a variable of a documented API endpoint based on a variable format within the implemented API endpoint information and/or common (or standardized) variable format to generate a transformed documented API endpoint. In one example, a documented API endpoint includes a variable within a corresponding endpoint path. The variable of a documented API endpoint is transformed to align the corresponding format with that of a variable format of an implemented API endpoint and/or a common format.

An API document uses an OpenAPI specification, a Swagger specification, or another standard specification for API documentation to define the API endpoint path variables. In one or more examples, the format of the documented API endpoint variable differs from that of the implemented API endpoint. The format of the implemented API endpoint path variables corresponds to the implementation framework of the implemented software application. In one or more examples, the implementation framework differs from the format within the API documentation.

Accordingly, the format of the variables within the API documentation is transformed such that the API documentation may be used as a comparison to determine whether or not implemented API endpoints are shadow API endpoints.

In one example, the format of the variable is transformed from a first format (e.g., representation) to a second format that differs from the first format, transforming the format of the API endpoint basepath. The first format is a format of variables used within the API documentation and the second format corresponds to the format of variables within the implemented API endpoint or a common variable format. In one example, the first format includes brackets surrounding the variable, e.g., "{variable}", and the second format includes a colon before the variable, e.g., ": variable". Accordingly, the format of the first format is transformed to match that of the second format. Transforming the variable from the first format to the second format includes transforming the documented API endpoint path. In one example, the endpath of a documented API endpoint has a format of "/rest/api/test/{variable}", and is transformed by the software security engine 420 to be "/rest/api/test/:variable". Transforming the documented API endpoint between formats allows the documented API endpoints to be compared with the implemented API endpoints to detect shadow API endpoints as is described in the following.

The transformed documented API endpoints are output to as a documented API endpoints memory (e.g., the main memory 704 and/or the machine-readable medium 724 of FIG. 7), as illustrated by 570 of FIG. 5. In one example, the transformed API endpoints are stored in a database and associated with a "documented" indication.

In one example, the operations described above as being performed by the software security engine 420 of FIG. 400 with regard to transforming the documented API endpoint may be performed partially, or completely, by the agent 410 of FIG. 400.

At 220, a transformed implemented endpoint is generated from the implemented API endpoint and the documented API endpoint. In one example, the transformed implemented API endpoint is generated by converting a format of a variable of the implemented API endpoint to another format as is described above with regard to transforming a documented API endpoint. In one example as is illustrated by 530 of FIG. 5, the software security engine 420 of FIG. 4 converts the format of a variable of an implemented API endpoint to generate a transformed implemented API endpoint.

In one example, the first format includes brackets surrounding the variable, e.g., "{variable}" or "{id}", and the second format includes a colon before the variable, e.g., ":variable" or ":id". Accordingly, as is described above, the first format is transformed to match that of the second format. In one or more examples, transforming the variable from the first format to the second format includes transforming the entire implemented API endpoint. Transforming the API endpoint allows the implemented API endpoints to be compared with the documented API endpoint paths.

The transformed implemented API endpoints are output to as a documented API endpoints memory (e.g., the main memory 704 and/or the machine-readable medium 724 of FIG. 7) as illustrated by 540 of FIG. 5. In one example, the transformed API endpoints are stored in a database and associated with a "non-documented" indication.

In one example, the operations described above as being performed by the software security engine 420 of FIG. 400 with regard to transforming the implemented API endpoint may be performed partially, or completely, by the agent 410 of FIG. 400.

At 230, a comparison scope is determined based on parameter information, header information, cookie information, and/or attribute information within the API documentation. The agent 410 determines the comparison scope based on the parameter information, the header information, the cookie information, and/or the attribute information. For example, the agent 410 analyzes the API endpoints of the API documentation and the implemented API endpoints to determine the parameter information, the header information, cookie information and the attribute information for an API endpoint within the API documentation and the implemented API endpoint. The determined parameter information, the header information, the cookie information, and the attribute information for an API endpoint within the API documentation and the implemented API endpoint are stored as comparison scope within a memory.

In one example, an implemented API endpoint includes parameter information having multiple strings (e.g., "username", "firstname", and "lastname"). The API documentation for a corresponding API endpoint may define the parameter information as including the same strings as the API endpoint or as having different strings. For example, an API endpoint within the API documentation may lack one or more strings that are included within the implemented API documentation. In one or more examples, an API endpoint within the API documentation includes the same strings that are included within the implemented API documentation. To determine the differences in parameter information between the parameter information within the API document and the parameter information for an implemented API endpoints, the parameter information for an API endpoint is determined from the API documentation and the parameter information for the implemented API endpoint is determined, and saved as a comparison scope. In one example, to determine the parameter information within the API documentation, an API documentation is processed to determine the parameter information for API endpoint. Processing the API documentation includes parsing the API documentation and searching (e.g., analyzing or locating) the parsed API documentation based on an API endpoint to determine the corresponding parameter information. An implemented API endpoint is parsed and analyzed to determine the parameter information for the implemented API endpoint. The determined parameter information is stored in a memory as a comparison scope.

In one example, an implemented API endpoint that has parameter information that differs from the parameter information of a corresponding API endpoint of the API documentation is a shadow API endpoint.

As the parameter information, the header information, the cookie information, and/or the attribute information may be used to inject malicious data, the comparison scope is generated based on the parameter information, the header information, the cookie information, and/or the attribute information. Parameter information includes at least one of a query parameter and a path parameter. Query parameters are defined after the end point with a question mark and a key value. An example query parameter is "/user?role=admin". Path parameter is a variable portion of the address path. A path parameter is used to point to a specific resource associated with an API. An example path parameter is/user/{id}. A header information includes the request header information. The request header is related to authorization. Header information may be common across all endpoints. Cookie information corresponds to small pieces of data that a web server send to a client device and are stored on a client device. The attribute information corresponds to a file format associated with the API endpoint path that is used to submit data via interactive forms. Attribute information may additionally, or alternatively include request attributes that are a key values are associated with a request when a software application based form is interacted with. For example, the attribute information may include x-www-form-urlencoded, JavaScript Objection Notation (JSON), or Extensible Markup Language (XML).

In one example, the operations described above as being performed by the agent 410 of FIG. 400 may be performed partially, or completely, by the software security engine 420 of FIG. 400.

With further reference to FIG. 1, at 130, a shadow API endpoint is determined based on a comparison of the implemented endpoint information and the endpoint comparison data. In one example, determining a shadow API endpoint includes determining an indication of whether an API endpoint is a shadow API endpoint. The indication may be some sort of flag or other indication that is associated with an API endpoint that may be used to indicate that the API endpoint is a shadow API endpoint. In one example, one or more processing devices execute instructions stored in a memory to compare the implemented endpoint information with the endpoint comparison data to execute the operations of the agent 410 and/or the software security engine 420 determine whether or not the API endpoint is not documented. The endpoint comparison data includes the expected path information, the transformed endpoint, and comparison scope determine as described above. In one example, the endpoint information of each implemented API endpoint is compared to the endpoint comparison information associated with the API endpoints of the API documentation. An API endpoint that is not found to be in the API documentation is determined to be not documented, and is a shadow API endpoint. For example, when the endpoint information of an implemented API endpoint is determined to not match (e.g., via a comparison) the endpoint comparison information associated with the API endpoints of the API documentation, the implemented API endpoint is determined to be a non-documented API endpoint, or a shadow API endpoint.

In one example, an UPSERT query (command) is used to determine whether or not an implemented API endpoint is included within an API document. An UPSERT query inserts a new entry when the data of the UPSERT query determined to not be present within the table. Further, an UPSERT query updates the data of a table that corresponds to the data of the UPSERT query.

Example constraints of the UPSERT query is "CREATE UNIQUE INDEX unique_request_project_id_path_method ON request (project_id, path, COALESCE (http_method_id, 0));" and "ALTER TABLE request_param ADD CONSTRAINT unique_request_param_name_type_request_id UNIQUE (request_id, name_request_param_type_id)". The UPSER query includes an insert/update commands. Example insert/update commands include "INSERT INTO request (project_id,http_method_id,path,segment, openapi_documented, openapi_description, openapi_summary, openapi_path, openapi_consumes, openapi_produces) VALUES (:projectId,:httpMethodId,:path,:segment, . . . ) ON CONFLICT (project_id, path, COALESCE (http_method_id, 0)) DO UPDATE SET openapi_documented=(request.openapi_documented OR EXCLUDED.openapi_documented).

At 140, the shadow API endpoints are output. In one example, the agent 410 and/or the software security engine 420 stores the shadow API endpoints in a memory. In one or more examples, the agent 410 and/or the software security engine 420 reports, or communicates, the shadow API endpoints to another system for mitigation. In one example, the agent 410 outputs the shadow API endpoints to the software security engine 420, and the software security engine 40 mitigates the security vulnerabilities related to the shadow API endpoints. In one example, as is illustrated by 580 of FIG. 5, the shadow API endpoints are output from the memory to a user or another computer system. In one example, outputting the shadow API endpoints includes outputting an indication corresponding to a shadow API endpoint.

FIG. 3 illustrates a flow chart of a method 300 for mitigating security vulnerabilities within a software application. In one example, the method 300 is performed by a computer system (e.g., the computer system 700 of FIG. 7). For example, one or more processing devices (e.g., the processing device 702 of FIG. 5) executes instructions (e.g., the instructions 726 of FIG. 7) stored in a memory (e.g., the main memory 704 and/or the machine-readable medium 724 of FIG. 7). In one example, the method 300 is performed part of a software application security testing process as is described above with regard to method 100 of FIG. 1.

At 310, implemented API endpoints are stored within a memory and are associated with a shadow API endpoint indication. In one example, the agent 410 determines implemented API endpoints from the software application 400 as is described above.

The software security engine 420 stores the determined implemented API endpoint(s) within a memory. In one example, the implemented API endpoint is stored as part (an entry) of a database. In one example, the implemented API endpoints are associated with an indication of "non-documented API endpoint" within the database. In other examples, the API endpoints are associated with other indications.

At 320, API endpoint information is determined from the API documentation associated with the software application. In one or more examples, the software security engine 420 and/or the agent 410 determines API endpoints from the API documentation associated with the software application 400. The agent 410 receives (e.g., obtains) the API documentation from the software application 400 or a memory, and the software security engine 420 analyzes the API documentation to determine the documented API endpoints. The API endpoints are transformed to determine the documented API endpoint information. In one example, the 210-230 of FIG. 2 are performed to generate documented API endpoint information (e.g., API endpoint comparison data) from the API documentation. The documented API endpoints information is stored in a memory. In one example, the documented API endpoint information is stored within a database and associated with a "documented" indication.

At 330, an indication associated with an implemented API endpoint is updated based on a comparison of the documented API endpoint information with the implemented API endpoints. In one example, the software security engine 420 obtains the API endpoint information and implemented API endpoints to determine shadow API endpoints. The software security engine 420 compares the API endpoint information with the implemented API endpoints to determine shadow API endpoints. In one example, the software security engine 420 uses an UPSERT query as described above to compare the implemented API endpoints to determine shadow API endpoints. The software security engine 420 generates an UPSERT query as described above based on the API endpoint information. The UPSERT query is applied to the database having implemented API endpoints. In one example, when the UPSERT query finds a matching implemented API endpoint, the indicator associated with the implemented API endpoint is updated to be documented. In other examples, other queries or methods may be used to detect which of the implemented API endpoints are documented within API documentation.

At 340, a report of the non-documented API endpoints is output. The non-documented API endpoints may be stored in a memory, displayed on a display, and/or printed, among others. In one example, the software security engine 420 generates a report of the non-documented API endpoints, and outputs the report (e.g., stores the report, displays the report on a display, and/or prints the report, among others). In one example, the software security engine 420 generates the report by searching, filtering, or polling the database to determine which of the implemented API endpoints are indicated as being a shadow API endpoint. In one example, the shadow API endpoints are mitigated by the software security engine 420, in addition to, or alternatively to, generating and outputting a report of non-documented API endpoints. In one endpoint, mitigating a shadow API endpoint includes removing the shadow API endpoint or updating the API documentation with the shadow API endpoint, among others.

In one example, a method includes obtaining API documentation and an implemented API endpoint for a software application. The implemented API endpoint is obtained during an implementation of the software application. The method further includes generating API endpoint comparison data from the API documentation. Further, the method includes determining, by a processing device, an indication of whether the implemented API endpoint is a shadow API endpoint based on a comparison of the API endpoint comparison data with the implemented API endpoint. The method further includes outputting the indication.

In one example, a system includes a memory storing instructions and a processing device. The processing device is coupled with the memory and to execute the instructions. The instructions when executed cause the processing device to obtain API documentation and an implemented API endpoint for a software application. The implemented API endpoint is obtained during an implementation of the software application. Further, the processing device is caused to generate API endpoint comparison data from the API documentation. The processing device is further caused to determine an indication of whether the implemented API endpoint is a shadow API endpoint based on a comparison of the API endpoint comparison data with the implemented API endpoint, and output the indication.

In one example, non-transitory computer readable medium comprising stored instructions, which when executed by one or more processing devices, cause the one or more processing devices to obtain implemented API endpoints from an implemented software application, and associate the implemented API endpoints with a respective indication. The one or more processing devices are further caused to determine documented API endpoints from API documentation of the software application, and update the indication of one or more of the implemented API endpoints based on a comparison of the implemented API endpoints with the document API endpoints. Further, the one or more processing devices output one or more of the indications associated with shadow API endpoints of the API endpoints.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    obtaining application programming interface (API) documentation and an implemented API endpoint for a software application, wherein the implemented API endpoint is obtained during an implementation of the software application;
    generating API endpoint comparison data from the API documentation, wherein generating the API endpoint comparison data comprises generating documented API endpoints of the software application by combining one or more of basepath information, partial basepath information, and endpoint path information of the software application;
    determining, by a processing device, an indication of whether the implemented API endpoint is a shadow API endpoint based on a comparison of the API endpoint comparison data with the implemented API endpoint; and
    outputting the indication.

2. The method of claim 1, wherein generating the API endpoint comparison data comprises generating the documented API endpoints of the software application based on the API documentation.

3. The method of claim 2, further comprising generating transformed API endpoints by converting a format of variables of the documented API endpoints.

4. The method of claim 3, wherein the method further comprises determining a comparison scope for the API endpoints within the API documentation based on at least one of parameter information, header information, cookie information, and attribute information associated with the API endpoints within the API documentation.

5. The method of claim 1, further comprising associating the implemented API endpoint with a shadow API endpoint indication within a memory, and associating the implemented API endpoint with a documented indication based on a comparison of the API endpoint comparison data with the implemented API endpoint.

6. The method of claim 1, further comprising mitigating a security vulnerability associated with the shadow API endpoint.

17

7. A system comprising:

a memory storing instructions; and a processing device, coupled with the memory and to execute the instructions, the instructions when executed cause the processing device to:

obtain application programming interface (API) documentation and an implemented API endpoint for a software application, wherein the implemented API endpoint is obtained during an implementation of the software application;

generate API endpoint comparison data from the API documentation, wherein generating the API endpoint comparison data comprises generating transformed documented API endpoints by converting a format of variables of documented API endpoints of the software application;

determine an indication of whether the implemented API endpoint is a shadow API endpoint based on a comparison of the API endpoint comparison data with the implemented API endpoint; and output the indication.

8. The system of claim 7, wherein generating the API endpoint comparison data comprises generating the documented API endpoints of the software application based on the API documentation.

9. The system of claim 8 wherein generating the documented API endpoints comprises combining one or more of basepath information, partial basepath information, and endpoint path information for the API endpoints of the software application.

10. The system of claim 7, wherein the one or more processing device are further caused to determine a comparison scope for the API endpoints within the API documentation based on at least one of parameter information, header information, cookie information, and attribute information associated with the API endpoints within the API documentation.

11. The system of claim 7, wherein the one or more processing devices is further caused to associate the implemented API endpoint with a shadow API endpoint indication within a memory, and associate the implemented API endpoint with a documented indication based on a comparison of the API endpoint comparison data with the implemented API endpoint.

12. The system of claim 7, wherein the one or more processing devices is further caused to mitigate a security vulnerability associated with the shadow API endpoint.

13. A non-transitory computer readable medium comprising stored instructions, which when executed by one or more processing devices, cause the one or more processing devices to:

obtain implemented application programming interface (API) endpoints from an implemented software application, and associate the implemented API endpoints with a respective indication;

determine documented API endpoints from API documentation of the software application, wherein determining the documented API endpoints comprises generating endpoint expected path information by combining one or more of basepath information, partial basepath information, and endpoint path information;

update the indication of one or more of the implemented API endpoints based on a comparison of the implemented API endpoints with the document API endpoints; and output one or more of the indications associated with shadow API endpoints of the API endpoints.

14. The non-transitory computer readable medium of claim 13, wherein the one or more processing devices are further caused to generate transformed documented API endpoints by converting a format of variables of the documented API endpoints.

15. The non-transitory computer readable medium of claim 13, wherein the one or more processing devices are further caused to determine a comparison scope for the documented API endpoints based on at least one of parameter information, header information, cookie information, and attribute information associated with the documented API endpoints.

16. The non-transitory computer readable medium of claim 13, wherein the one or more processing devices are further caused to query the implemented API endpoints to compare the implemented API endpoints with the documented API endpoint and determine to update the indications.

17. The non-transitory computer readable medium of claim 13, wherein the one or more processing devices is further caused to mitigate a security vulnerability associated with the shadow API endpoint.

* * * * *